United States Patent
Giles et al.

(10) Patent No.: US 10,655,342 B2
(45) Date of Patent: May 19, 2020

(54) WATER RESISTANT FLOORING UNDERLAYMENT

(71) Applicant: Maxxon Corporation, Hamel, MN (US)

(72) Inventors: Patrick Henry Giles, Nowthen, MN (US); August Foss, Annandale, MN (US); Konstantin Zuyev, N Plymouth, MN (US)

(73) Assignee: Maxxon Corporation, Hamel, MN (US)

( * ) Notice: Subject to any disclaimer, the term of this patent is extended or adjusted under 35 U.S.C. 154(b) by 281 days.

(21) Appl. No.: 15/271,582

(22) Filed: Sep. 21, 2016

(65) Prior Publication Data
US 2018/0080234 A1 Mar. 22, 2018

(51) Int. Cl.
*E04F 15/20* (2006.01)
*B32B 13/00* (2006.01)
*B32B 7/06* (2019.01)
*E04F 15/18* (2006.01)
(Continued)

(52) U.S. Cl.
CPC ............ *E04F 15/203* (2013.01); *B32B 7/12* (2013.01); *B32B 13/00* (2013.01); *B32B 27/06* (2013.01); *E04F 15/182* (2013.01); *E04F 15/186* (2013.01); *B32B 2307/102* (2013.01); *B32B 2419/00* (2013.01)

(58) Field of Classification Search
USPC ......................................................... 156/71
See application file for complete search history.

(56) References Cited

U.S. PATENT DOCUMENTS

| 2,491,487 A | 12/1949 | Faulwetter |
| 3,190,762 A | 6/1965 | Carlson et al. |
| 4,371,399 A | 2/1983 | May et al. |

(Continued)

FOREIGN PATENT DOCUMENTS

| WO | 2003082766 A1 | 10/2003 |
| WO | 2013122974 A1 | 8/2013 |

OTHER PUBLICATIONS

T.Aberle, P.Emmenegger, F. Vallee, L. Herschke, New Approaches to Increase Water Resistance of Gypsum Based Building Materials, Drymor Mortar Yearbook 2010.

*Primary Examiner* — Sing P Chan
(74) *Attorney, Agent, or Firm* — Fredrikson & Byron, P.A.

(57) ABSTRACT

A method of installing a flooring structure is disclosed. The method includes providing an acoustic insulating layer over a sub-floor layer. The method also includes providing an underlayment layer over the acoustic insulating layer. The provided underlayment layer includes gypsum concrete having a water-resistant additive. Also disclosed is a flooring structure. The flooring structure includes an acoustic insulating layer over a sub-floor layer. The flooring structure also includes an underlayment layer having a first side and a second side opposite the first side. The underlayment layer includes gypsum concrete having a water-resistant additive. Additionally disclosed is a gypsum concrete flooring underlayment product. The product includes a mixture of alpha calcium sulfate hemihydrate and beta calcium sulfate hemihydrate. The product also includes a silane-based powder intermixed with the mixture of alpha calcium sulfate hemihydrate and beta calcium sulfate hemihydrate.

9 Claims, 2 Drawing Sheets

(51) Int. Cl.
*B32B 7/12* (2006.01)
*B32B 27/06* (2006.01)

(56) References Cited

U.S. PATENT DOCUMENTS

| | | | |
|---|---|---|---|
| 4,444,925 A | | 4/1984 | Feldman |
| 4,851,047 A | | 7/1989 | Demlehner et al. |
| 4,874,431 A | * | 10/1989 | Fey ..................... C04B 41/4922 |
| | | | 106/2 |
| 5,437,722 A | | 8/1995 | Borenstein |
| 5,626,668 A | | 5/1997 | Gerhardinger et al. |
| 5,776,245 A | * | 7/1998 | Thomas .................. C04B 24/42 |
| | | | 106/2 |
| 7,849,648 B2 | | 12/2010 | Tonyan et al. |
| 7,861,488 B2 | | 1/2011 | Giles et al. |
| 8,069,633 B2 | | 12/2011 | Tonyan et al. |
| 8,171,687 B2 | | 5/2012 | Dellinger et al. |
| 8,544,218 B2 | | 10/2013 | Dellinger et al. |
| 8,568,544 B2 | | 10/2013 | Engbrecht et al. |
| 8,590,268 B2 | | 11/2013 | Giles |
| 8,703,874 B2 | | 4/2014 | Aberle et al. |
| 9,157,231 B2 | | 10/2015 | Wingfield et al. |
| 9,216,927 B2 | | 12/2015 | Hagen et al. |
| 2002/0040666 A1 | | 4/2002 | Eck et al. |
| 2011/0024229 A1 | * | 2/2011 | Yang ...................... B60N 3/048 |
| | | | 181/294 |
| 2012/0034441 A1 | | 2/2012 | Adzima et al. |
| 2013/0216762 A1 | | 6/2013 | Chan et al. |
| 2013/0189530 A1 | | 7/2013 | Thompson |
| 2015/0158766 A1 | | 6/2015 | Teng et al. |

\* cited by examiner

WATER RESISTANT FLOORING UNDERLAYMENT

TECHNICAL FIELD

Embodiments of the present invention relate generally to flooring structures in buildings and methods of installing such flooring structures.

BACKGROUND

A typical flooring structure in a building, such as a residential building, includes a support structure (e.g., a joist), a sub-floor layer over the support structure, and a finished floor layer. The finished floor layer can include, for instance, carpet, tile, wood, vinyl, or other floor covering material. In many instances, an underlayment layer is provided between the sub-floor layer and the finished floor layer. An underlayment layer can be made up of a variety of one or more materials. One general type of underlayment layer is concrete, which can be useful in providing a variety of functions. For example, a concrete underlayment layer can be useful for providing a more stabilized finished floor layer (e.g., by leveling out the underlying sub-floor layer), providing a moisture barrier, and/or providing a sound mitigation function.

However, incorporating a concrete underlayment layer into a floor structure generally requires an increase in time and labor, and hence cost, associated with installation of the floor structure. This is due, in part, to the need to apply a primer/sealer (e.g., a moisture sealant) to various types of concrete underlayments before the finished floor layer can be installed onto the concrete underlayment layer. In addition to the increase in labor needed to apply the primer/sealer, the time associated with incorporating the concrete underlayment layer into the floor structure is necessarily prolonged (e.g., to allow the primer/sealer to set once applied), particularly if multiple primer/sealer coats need to be applied.

SUMMARY

In general, various embodiments disclosed herein provide methods and flooring structures that do away with the need to apply a primer and/or sealer coat to a concrete, such as gypsum, underlayment layer (e.g., a surface of such concrete underlayment layer interfacing with the to-be-installed finished floor layer). In some embodiments of the methods and structures disclosed herein there is no primer coat between the gypsum concrete underlayment layer and the to-be-installed finished floor layer. In other embodiments of the methods and structures disclosed herein there is no sealer coat between the gypsum concrete underlayment layer and the to-be-installed finished floor layer. In still some further embodiments of the methods and structures disclosed herein there is no primer coat and no sealer coat between the gypsum concrete underlayment layer and the to-be-installed finished floor layer. As such, one embodiment of a flooring structure, and related methods of installing such flooring structure, can include an upper-most layer as a gypsum concrete underlayment layer that is adapted to directly receive a finished floor layer (e.g., the gypsum concrete underlayment layer is adapted to directly receive an adhesive on a first side of the finished floor layer).

As a result, a finished floor layer can be adhered (e.g., directly) to the concrete, such as gypsum, underlayment layer without any primer and/or sealer coat in between these layers. Consequently, the time, labor, and costs associated with incorporating such concrete underlayment layer in a flooring structure can be reduced. At the same time, these various embodiments still provide a concrete, such as gypsum, underlayment layer that serves, for example, sound mitigation, moisture barrier, fire protection and/or self-leveling functions.

One embodiment includes a method of installing a flooring structure. The method includes providing an acoustic insulating layer over a sub-floor layer. The method further includes providing an underlayment layer over the acoustic insulating layer, where the underlayment layer includes gypsum concrete having a water-resistant additive.

Another embodiment includes a flooring structure. The flooring structure has an acoustic insulating layer over a sub-floor layer. The flooring structure further has an underlayment layer that includes gypsum concrete having a water-resistant additive. In certain embodiments disclosed herein, the water-resistant additive is a silane-based powder. As one example disclosed herein, the silane-based powder includes alkyloxysilane intermixed in the gypsum concrete. In other examples disclosed herein, the water-resistant additive can include one or more additional or alternative silane-based powders.

A further embodiment includes a gypsum concrete flooring underlayment product. The product includes a mixture of alpha calcium sulfate hemihydrate and beta calcium sulfate hemihydrate. The product also includes a silane-based powder intermixed with the mixture of alpha calcium sulfate hemihydrate and beta calcium sulfate hemihydrate.

Because various embodiments disclosed herein do away with the need to apply a primer and/or sealer coat to the concrete underlayment layer, a side of the concrete underlayment layer opposite the sub-floor layer side can be adapted to be in direct contact with the finished floor layer. This can mean that, in some such embodiments, the side of the underlayment layer opposite the sub-floor layer side is adapted to be in direct contact with an adhesive, or other material, useful for securing the finished floor layer in place. Thus, the floor structure may lack a primer and/or sealer coat layer in between the underlayment layer and the finished floor layer.

The details of one or more examples are set forth in the accompanying drawings and the description below. Other features, objects, and advantages will be apparent from the description and drawings, and from the claims.

BRIEF DESCRIPTION OF DRAWINGS

The following drawings are illustrative of particular examples of the present invention and therefore do not limit the scope of the invention. The drawings are not to scale and are intended for use in conjunction with the exemplary explanations in the following detailed description. Examples of the present invention will hereinafter be described in conjunction with the appended drawings.

DETAILED DESCRIPTION

The following detailed description is exemplary in nature and is not intended to limit the scope, applicability, or configuration of the invention in any way. Rather, the following description provides some practical illustrations for implementing examples of the present invention. Those skilled in the art will recognize that many of the noted examples have a variety of suitable alternatives.

Figure 1:
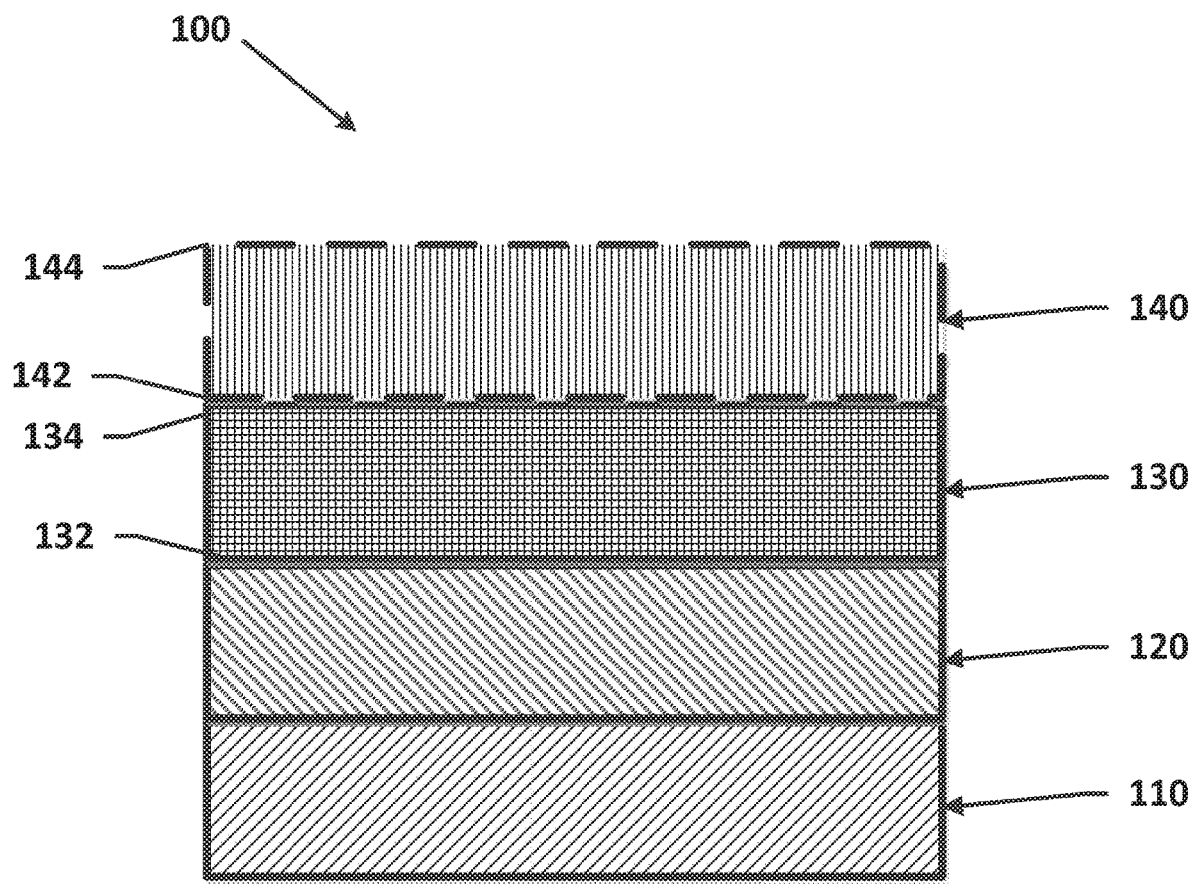
FIG. 1 is a schematic cross-sectional view of an exemplary embodiment of a flooring structure.

FIG. 1 illustrates a schematic cross-sectional view of an exemplary embodiment of a flooring structure 100. The flooring structure 100 can be supported on a support structure (not shown), such as a joist or other structural supporting surface. As shown, the flooring structure 100 can include a number of layers, such as a sub-floor layer 110, acoustic insulating layer 120, underlayment layer 130, and/or finished floor layer 140. As one example, an embodiment of the flooring structure 100 may not include the finished floor layer 140.

The sub-floor layer 110 can be a first layer in the flooring structure 100. As such, the sub-floor layer may interface with the support structure (e.g., be in direct contact with the support structure) and serve as an initial, structurally supporting substrate for the subsequently applied layers of the flooring structure 100. The material of the sub-floor layer 110 can vary depending on the application and structural support requirements for the flooring structure 100. For example, the sub-floor layer 110 can be plywood, oriented strand board (OSB), concrete (e.g., precast concrete), metallic decking, or various other types of materials and combinations thereof. The sub-floor layer 110 may be a single layer in some examples, but in other examples may include multiple sub-layers (e.g., each sub-layer of a different material).

The acoustic insulating layer 120 can be applied over the sub-floor layer 110. In some instances, the acoustic insulating layer 120 may be floated over the sub-floor layer 110 or secured to the sub-floor layer 110 through the use of adhesive(s). In some embodiments of the flooring structure 100, the acoustic insulating layer 120 may be in direct contact with a second surface of the sub-floor layer 110 opposite a first surface of the sub-floor layer 100 interfacing with the support structure. The acoustic insulating layer 120 may be a single layer in some examples, but in other examples may include multiple sub-layers (e.g., each sub-layer of a different material, multiple sub-layers of the same material). The acoustic insulating layer 120 can serve to provide sound mitigation functionality, for instance where the flooring structure 100 is utilized in a sound-sensitive application (e.g., a multi-floor dwelling, such as an apartment building, or office complex).

The acoustic insulating layer 120 used in the flooring structure 100 can be in a variety of forms and materials. As one example, the acoustic insulating layer can be, or include as one sub-layer, a sound control mat. In such an example, the sound control mat can be laid over the sub-floor layer. The sound control mat can be made up of a variety of materials and/or a number of secured sub-layers, depending on the application of the flooring structure 100.

One example of a sound control mat used as an acoustic insulating layer 120 in the flooring structure 100 is a base entangled acoustical net material having in combination with a non-woven fabric material attached on at least one side of the acoustical net material (e.g., attached on two opposing sides of the acoustical net material). The non-woven fabric material can be, for instance, thermally bonded to the at least one side of the acoustical net material. The nonwoven fabric material can be, in one embodiment, made up of a fiber or mixture of fibers (e.g., a bicomponent binder fiber, a PET fiber, a nylon fiber, an acrylic fiber, and any mixtures thereof). The base entangled acoustical net material can be, in one embodiment, made up of a polymeric and/or polymer material or fiber (e.g., polypropylene, nylon 6, nylon 6.6, polyester, and any combinations thereof) fused together with a plurality of distributed bonding points throughout the base entangled acoustical net material. The base entangled acoustical net material can serve to provide an air cavity within the sound mat, such that the thickness of the base entangled acoustical net material included in the exemplary sound mat is a function of the desired depth of the air cavity provided thereby. As this air cavity can provide additional acoustical insulation, the thickness of the base entangled acoustical net material can vary based on the acoustical insulation needs of the particular flooring structure 100 application.

Another example of a sound control mat that can be used as an acoustic insulating layer 120 in the flooring structure 100 is an entangled monofilament structure with a water resistant separation layer on a first side and an elastic, non-rigid layer on a second opposite side. Both the water resistant separation layer and the elastic, non-rigid layer can be joined to the entangled monofilament structure by thermal, mechanical, or adhesive coupling. The water resistant separation layer can include, for instance, a polymeric film or sheet, rubber film or sheet, closed cell foam(s), glass, metal and/or combinations thereof. The water resistant separation layer can be configured to prevent moisture transport therethrough and into the entangled monofilament structure. The entangled monofilament structure can include, for instance, nylon, polyolefin, polyvinyl halide, polystyrene, polyamide, polyester, polyvinylester, and/or mixtures and copolymers thereof. The elastic, non-rigid layer can include, for instance, a textile fabric such as a meltblown nonwoven layer including polyolefin, polyamide, polyester, thermoplastic elastomer, polyurethane, and/or mixtures and copolymers thereof. The elastic, non-rigid layer can also be in the form of a foam layer in one embodiment. In some examples, the elastic, non-rigid layer can form a bottom surface (e.g., the surface interfacing with the sub-floor layer 11) of the sound mat, while in other examples the elastic, non-rigid layer can be at other locations within the sound mat.

The underlayment layer 130 can be situated over the acoustic insulating layer 120. The underlayment layer 130 may be a single layer in some examples, but in other examples may include multiple sub-layers. The underlayment layer 130 includes a first side 132 and a second opposite side 134. As shown in the illustrated example, the first side 132 can be adjacent the acoustic insulating layer 120 while the second side 134 can be adjacent the finished floor layer 140 (in embodiments where the finished floor layer 140 is present in the flooring structure 100). In some examples an intermediate layer, such as a film or coat, can be situated between the acoustic insulating layer 120 and the first side 132, while in other examples the acoustic insulating layer 120 and the first side 132 can be in direct contact.

The underlayment layer 130 can be made up of a concrete material. In various embodiments, the underlayment layer 130 can include gypsum concrete. In some such embodiments, the gypsum concrete, and thus the underlayment layer 130, can include a mixture of alpha calcium sulfate hemihydrate (alpha-$CaSO_4 0.5H_2O$) and beta calcium sulfate hemihydrate (beta-$CaSO_4 0.5H_2O$). This exemplary underlayment layer 130 may additionally include sand, water, portland cement, and/or additives (e.g., an extender, such as sodium citrate extender, a fluidizer, such as a sodium or potassium based fluidizer, a surfactant, such as a hydrocarbon based surfactant, diutan gum, platic resin, and/or an appropriate defoamer).

Embodiments of the underlayment layer 130 having alpha calcium sulfate hemihydrate, in addition to beta calcium sulfate hemihydrate, can be useful in flooring applications since a stronger underlayment layer can be provided relative to gypsum having only beta calcium sulfate hemihydrate. As one example, the underlayment layer 130 can include the mixture of alpha calcium sulfate hemihydrate and beta calcium sulfate hemihydrate as between 90% and 95% by weight of the underlayment layer 130, such as measured prior to overlayment on the acoustic insulating layer.

In some such embodiments where the underlayment layer 130 includes gypsum concrete (e.g., a mixture of mixture of alpha calcium sulfate hemihydrate and beta calcium sulfate hemihydrate), such as that described previously, the gypsum concrete can have a water-resistant additive. In many cases, such gypsum concrete underlayment layer includes the water-resistant additive intermixed in the gypsum concrete prior to providing the gypsum concrete underlayment layer over the acoustic insulating layer.

The water-resistant additive can be any, or a combination of any, suitable material. As one example, the water-resistant additive can be a silane-based additive, such as a silane-based powder, distributed within the underlayment layer 130. For instance, the silane-based additive can include alkyloxysilane that is intermixed within the gypsum concrete, and any other components of the underlayment layer 130 (when present in certain embodiments). In additional exemplary embodiments, the water-resistant additive can be a silane-based powder including any of the following intermixed in the gypsum concrete: alkyloxysilane, alkylsilane, acetoxysilane, aminosilane, diaminosilane, aminoalkylsilane, arylsilane, epoxysilane, fluoroalkylsilane, glycolsilane, mercaptosilane, methacrylsilane, silicic acid ester silane, silylsilane, ureidosilane, vinylsilane, vinylalkylsilane, or any combination of two or more of these additives.

The silane-based additive, including any of those disclosed herein, can take various concentrations as appropriate for the particular application of the flooring structure 100. As one example, the underlayment layer 130 can include the silane-based additive as between 0.4% and 1% by weight of the underlayment layer 130, such as measured when the silane-based additive is in powder form prior to overlayment on the acoustic insulating layer (e.g., in one example as measured when the silane-based additive is in powder form and the underlayment layer consists of gypsum concrete and the silane-based additive, prior to addition of water, sand, and/or other additives). In another example, the underlayment layer 130 can include the silane-based additive as between 0.4% and 9%, such as between 1% and 9% or between between 1% and 3%, by weight of the underlayment layer 130, such as measured when the silane-based additive is in powder form prior to overlayment on the acoustic insulating layer.

The previously described exemplary underlayment layer 130 having the water-resistant additive, such as the silane-based additive, can provide a variety of useful features. For instance, such an underlayment layer 130 can be substantially non-porous, generally water-resistant, and adapted to directly receive a finished floor layer (e.g., an adhesive used in the finished floor layer) without requiring a primer and/or sealer coat over the underlayment layer 130 prior to receiving the finished floor layer. In such embodiments, the flooring structure 100 can ultimately include the second side 134 of the underlayment layer 130 in direct contact with the finished floor layer 140. As an example, the finished floor layer 140 can include a first side 142 and a second opposite side 144. The first side 142 of the finished floor layer 140 can include an adhesive (e.g., glue) in direct contact with the second side 134 of the underlayment layer 130. As a result, in such example the first side 142 of the finished floor layer 140 (e.g., the adhesive of the finished floor layer) is in direct contact with the second side 134 of the underlayment layer 130 without a primer and/or sealer coat disposed between such sides. The second side 144 of the finished floor layer 140 can include a flooring material, such as carpet, tile, wood, vinyl, or other appropriate finished flooring material.

The underlayment layer 130 as disclosed herein can also provide an increased fire rating for the flooring structure 100. For instance, use of the disclosed underlayment layer 130 can, in some instances, provide a flooring structure having up to 110 Underwriters Labs hourly fire rating. In addition, use of the disclosed underlayment layer 130 can also act to provide acoustical insulation and thereby provide a high sound rated flooring structure, such as in conjunction with the acoustic insulating layer 120.

Figure 2:
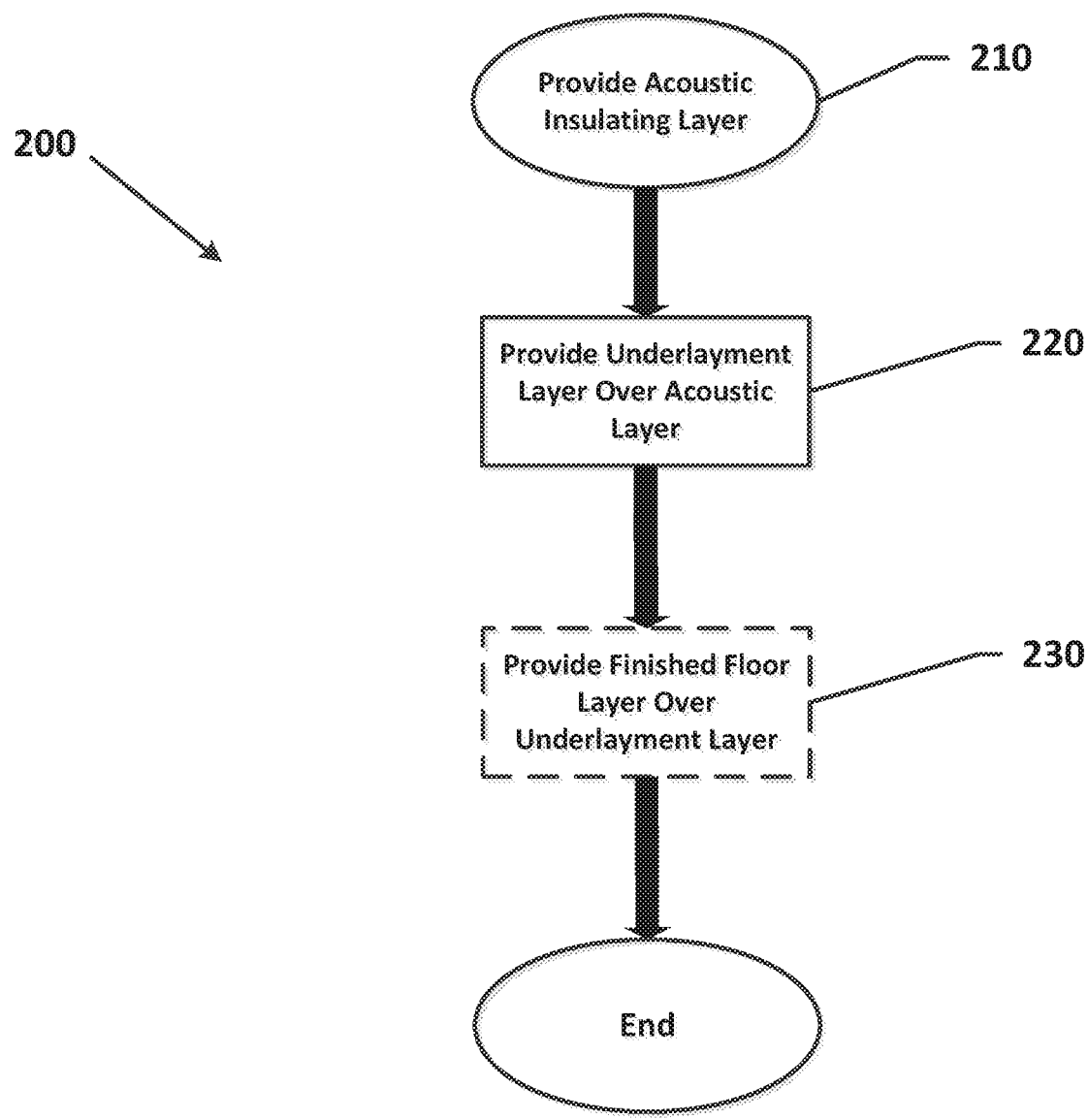
FIG. 2 is a flow diagram of an exemplary embodiment of a method of installing a flooring structure.

In addition to the previously described exemplary flooring structure embodiments, exemplary methods of installing a flooring structure will now be discussed. FIG. 2 illustrates a flow diagram of an exemplary embodiment of a method 200 of installing a flooring structure (e.g., the flooring structure 100).

At step 210, an acoustic insulating layer can be provided over a sub-floor layer. The provided acoustic insulating layer can be, for instance, similar to one or more of the acoustic insulating layer embodiments described previously. Thus, in one embodiment step 210 can include laying a sound control mat, such as a sound control mat similar to one or more of the embodiments described previously, over the sub-floor layer.

At step 220, an underlayment layer can be provided over the acoustic insulating layer. The provided underlayment layer can be, for instance, similar to one or more of the underlayment layer embodiments described previously.

For example, in one embodiment of the method 200 step 220 can include providing an underlayment layer that includes gypsum concrete with a water-resistant additive intermixed in the gypsum concrete. In this way, the gypsum concrete can be provided in a form that is adapted to directly contact a finished floor layer (e.g., an adhesive of the finished floor layer). The water-resistant additive can be, for instance, a silane-based powder having alkyloxysilane that accounts for less than 1% (e.g., between 0.4% and 1%) by weight of the underlayment layer, such as measured when the silane-based additive is in powder form prior to overlayment on the acoustic insulating layer. The underlayment layer can be provided at step 220, in one embodiment, by pouring a mixture that includes alpha calcium sulfate hemihydrate, beta calcium sulfate hemihydrate, sand, water, a silane-based powder, and/or one or more of the additives described above over the acoustic insulating layer.

Some further embodiments of the method 200 include, at step 230, providing a finished floor layer over the underlayment layer. Although, as indicated in FIG. 2, some embodiments may not include step 230. In embodiments that do include step 230, a first side of the underlayment layer can be provided adjacent the acoustic insulating layer and a second opposite side of the underlayment layer can be provided adjacent the finished floor layer. As one example, the second side of the underlayment layer may be provided in direct contact with a first side of the finished floor layer. This can include the second side of the underlayment layer being provided in direct contact with an adhesive (e.g., glue) at the first side of the finished floor layer. In this embodiment, the second side of the underlayment layer can be adapted to be in direct contact with the first side of the finished floor layer (e.g., the adhesive of the finished floor layer) without a primer and/or sealer coat applied to the second side of the underlayment layer. Thus, embodiments of step 230 can include providing the finished floor layer over the underlayment layer without applying a primer coat in between. Likewise, various embodiments of the method 200 may not include a step of applying a primer coat to the second side (e.g., an exposed side of the underlayment layer opposite the side facing the acoustic insulating layer and sub-floor layer) of the underlayment layer. A second side of the finished floor layer opposite the first side can include a flooring material.

In addition to the various exemplary flooring structure and method embodiments disclosed herein, other exemplary embodiments can include a gypsum concrete underlayment product. One example of a gypsum concrete underlayment product can include a mixture of alpha calcium sulfate hemihydrate and beta calcium sulfate hemihydrate, as well as a silane-based powder intermixed with the mixture of alpha calcium sulfate hemihydrate and beta calcium sulfate hemihydrate. A further example of a gypsum concrete underlayment product can include a mixture of alpha calcium sulfate hemihydrate, beta calcium sulfate hemihydrate, sand, portland cement, and a silane-based powder having alkyloxysilane and/or any one or more other silane-based additives disclosed herein. Another example of a gypsum concrete underlayment product can include a mixture of alpha calcium sulfate hemihydrate, beta calcium sulfate hemihydrate, sand, portland cement, a silane-based powder having alkyloxysilane, and one or more additives (e.g., an extender, such as sodium citrate extender, a fluidizer, such as a sodium or potassium based fluidizer, a surfactant, such as a hydrocarbon based surfactant, diutan gum, platic resin, and/or an appropriate defoamer).

Any of such disclosed embodiments of the gypsum concrete underlayment product may be provided as a mixture in a container (e.g., a bag) without including water. In such instances, the gypsum concrete underlayment product can include the combination of alpha calcium sulfate hemihydrate and beta calcium sulfate hemihydrate as between 90% and 95% by weight of the product as well as the silane-based powder as between 0.4% and 9% by weight of the product. Such concentration of the silane-based powder has been discovered to provide an optimal water resistance to the gypsum concrete underlayment product by minimizing both water uptake of the product and costs associated with including the silane-based powder. When it is desired to install a gypsum concrete underlayment layer, water, sand, and/or other additives can be added and intermixed with the gypsum concrete underlayment product disclosed herein, and the hydrated, intermixed product can be poured as slurry onto a flooring structure (e.g., onto an acoustic insulating layer of a flooring structure).

Various examples have been described. These and other examples are within the scope of the following claims.

The invention claimed is:

1. A method of installing a flooring structure, the method comprising the steps of:

providing an acoustic insulating layer over a sub-floor layer; and providing an underlayment layer over the acoustic insulating layer, the underlayment layer comprising gypsum concrete including a mixture of alpha calcium sulfate hemihydrate and beta calcium sulfate hemihydrate and having a water-resistant, silane-based additive, wherein the underlayment layer comprises the gypsum concrete including the mixture of alpha calcium sulfate hemihydrate and beta calcium sulfate hemihydrate as between 90% and 95% by weight of the underlayment layer prior to providing the underlayment layer over the acoustic insulating layer, and wherein the water-resistant, silane-based additive comprises between 0.4% and 9% by weight of the underlayment layer prior to providing the underlayment layer over the acoustic insulating layer, wherein the provided underlayment layer is adapted to directly receive a finished floor layer without a primer or sealer coat applied to the underlayment layer.

2. The method of claim 1, wherein the water-resistant, silane-based additive comprises alkyalkoxysilane intermixed in the gypsum concrete.

3. The method of claim 2, wherein the water-resistant, silane-based additive comprises between one percent and nine percent by weight of the underlayment layer prior to providing the underlayment layer over the acoustic insulating layer.

4. The method of claim 1, wherein the acoustic insulating layer is provided to include a sound control mat laid over the sub-floor layer, the sound control mat having blends of polymeric fibers with a nylon reinforcement.

5. The method of claim 1, wherein a first side of the underlayment layer is provided adjacent the acoustic insulating layer and a second side of the underlayment layer opposite the first side is provided to be adjacent a finished floor layer.

6. The method of claim 5, wherein the second side of the underlayment layer is provided to be in direct contact with an adhesive at a first side of the finished floor layer that is opposite a second side of the finished floor layer having a flooring material.

7. The method of claim 6, wherein the second side of the underlayment layer is provided to be in direct contact with the adhesive without a primer or sealer coat between the second side of the underlayment layer and the adhesive.

8. The method of claim 1, further comprising the step of:
providing a finished floor layer directly onto the underlayment layer without applying a primer or sealer coat applied to the underlayment layer.

9. The method of claim 1, wherein the provided underlayment layer further comprises another additive selected from the group consisting of: an extender, a fluidizer, a surfactant, and a defoamer.

* * * * *